United States Patent
Hershey

(10) Patent No.: US 8,444,361 B1
(45) Date of Patent: May 21, 2013

(54) PORTABLE LOG SKIDDER

(76) Inventor: Weldon Hershey, Stone Lake, WI (US)

( * ) Notice: Subject to any disclaimer, the term of this patent is extended or adjusted under 35 U.S.C. 154(b) by 893 days.

(21) Appl. No.: 12/378,516

(22) Filed: Feb. 17, 2009

Related U.S. Application Data

(60) Provisional application No. 61/065,806, filed on Feb. 19, 2008.

(51) Int. Cl.
*A01G 23/02* (2006.01)

(52) U.S. Cl.
USPC ............ 414/23; 414/460; 414/538; 254/324; 254/325

(58) Field of Classification Search .................. 414/460, 414/537, 538, 23; 254/324, 325
See application file for complete search history.

(56) References Cited

U.S. PATENT DOCUMENTS

| | | | |
|---|---|---|---|
| 891,385 A | 6/1908 | Strange | |
| 3,229,833 A * | 1/1966 | Heck et al. | 414/529 |
| 3,576,266 A * | 4/1971 | Widley | 254/326 |
| 3,956,835 A | 5/1976 | Evenson | |
| 3,976,210 A | 8/1976 | Allen | |
| 3,978,990 A | 9/1976 | Honea | |
| 4,102,528 A | 7/1978 | Cripe | |
| 4,278,392 A | 7/1981 | Meisel, Jr. | |
| 4,648,778 A | 3/1987 | Schultz | |
| 4,685,855 A | 8/1987 | Celli | |
| 5,564,887 A | 10/1996 | Brooks | |
| 6,231,030 B1 | 5/2001 | Smith | |
| 7,611,320 B2 * | 11/2009 | Bell | 414/462 |

* cited by examiner

*Primary Examiner* — Scott Lowe
(74) *Attorney, Agent, or Firm* — Montgomery Patent & Design; Robert C. Montgomery

(57) ABSTRACT

A portable log skidder designed for towing with various vehicles comprising a self-contained battery-operated winch is herein disclosed. The skidder comprises a steel frame providing an "L"-shaped configuration. An inverted "U"-shaped structure at a rear location provides an opening and an upper pulley over the open frame. To utilize the log skidder, it is positioned in proximity to a large log. A steel cable is extended from the winch and strapped around one end of the log. Next, the winch is used to raise one (1) end of the log slightly off the ground. The log skidder, along with the log, is then pulled using a vehicle thereto a location where the log can be harvested for firewood, lumber, or other purposes. The log is centered over two (2) pneumatic rubber tires on the frame which carry the weight of the log skidder and the log. The winch is controlled by a tethered remote control unit at a safe distance.

14 Claims, 4 Drawing Sheets

PORTABLE LOG SKIDDER

RELATED APPLICATIONS

The present invention was first described in and claims the benefit of U.S. Provisional Patent No. 61/065,806 filed Feb. 19, 2008, the entire disclosures of which are incorporated herein by reference.

FIELD OF THE INVENTION

The present invention relates generally to a portable log skidder removably attachable to a tow vehicle for transporting felled logs from a felling site to another site.

BACKGROUND OF THE INVENTION

The harvesting of timber is an operation that occurs all over the world on a daily basis. While much of this harvesting is done by large-scale harvesting operations, there are small-scale operations as well. Small-scale operations are often necessary to obtain specialty hardwoods in a larger forest setting, as part of property maintenance, or during storm cleanup. One (1) goal of these operations is to not disturb other trees, plant life, and wildlife, which is impossible using large machinery. Once the tree is felled and branches are removed, it is necessary to remove the trunk as this is where much of the valuable wood is stored. It is often impossible to get large equipment into heavily wooded areas to remove the trunk section. As a result the trunk is often cut into smaller and less valuable pieces to permit removal. Accordingly, there exists a need for a means by which fallen tree trunks and large limbs can be removed intact from wooded areas without the disadvantages of large equipment and without disturbing nearby areas. The development of the apparatus herein described fulfills this need.

Several attempts have been made in the past to overcome these problems and provide a means for skidding logs. U.S. Pat. No. 3,956,835, issued in the name of Evenson, describes a log skidder comprising a bulldozer assembly, a cable guide mechanism, a cable, and a winch assembly for paying out a cable and guiding a fallen log for skidding purposes. However, unlike the present apparatus, the Evenson log skidder with implement mounted cable guide means is a large piece of heavy equipment which is ill-suited for work in sensitive or dense work areas.

U.S. Pat. No. 891,385, issued in the name of Strange, describes a wheeled logging cart comprising a supporting arched axle, clamping tongs, and a hoisting mechanism intended to secure and drag fallen logs behind draft animals. U.S. Pat. No. 4,648,778, issued in the name of Schults, describes a log lifter comprising a collapsible support frame, a gripping clamp and a hoist mechanism used to lift large logs to facilitate cutting. However, unlike the present apparatus, the Strange logging-cart and the Schultz log lifter disadvantageously only provide manual hoisting mechanisms and lack a stabilized and transportable frame for efficiently removing fallen timber for processing.

U.S. Pat. No. 5,564,887, issued in the name of Brooks, describes a log skidder comprising a frame and a pivotal attachment for receiving a three-point hitch component of a tractor for tiltingly manipulating and lifting the end of a fallen log for removal from an area by use of common farm equipment. Again, unlike the present apparatus, the Brooks log skidder is not an effective means of removing logs from delicate environmental areas.

Other known prior art for log skidders include U.S. Pat. Nos. 3,956,835; 4,102,528; and 4,278,392.

While these devices fulfill their respective, particular objectives and appear to disclose various attempts to secure, lift, and remove felled and fallen logs; none of the prior art particularly discloses a portable log skidder comprising a base frame, a lifting frame, a ball hitch, a wheel assembly, and a wench assembly for skidding logs utilizing an ATV. Accordingly, there exists a need for a portable log skidder that operates without the disadvantages as described above.

SUMMARY OF THE INVENTION

In view of the foregoing prior art, the present apparatus is contemplated to solve the aforementioned inherent disadvantages and it has been observed that there is need for a portable log skidder which provides a means to skid logs behind an ATV or similar small vehicle for removal from densely forested areas or sensitive areas.

To achieve the above objectives, it is an object of the present apparatus to provide a portable log skidder intended for use with an all-terrain vehicle (ATV) comprising a support frame and a self-contained battery-operated winch. In accordance with the apparatus the portability of the frame can easily be backed into position over a large log in confined or sensitive environments.

A further objective of the present apparatus is to provide a support frame comprising an "L"-shaped lifting frame which provides a rigid structure for the log to be lifted and secured within, a base frame which supports the wheel assembly, and two (2) diagonal cross members which provide additional strength and stability to the invention. Such a support structure can hold a large load relative to its own size and weight.

Yet still another object of the present apparatus is to provide a wheel and tire assembly which provides a means of effective off-road transportation of the apparatus. The log is positioned within a center portion of the lifting frame over the two (2) tires which then carry the vast majority of the weight of the combined apparatus and log, thus passing very little weight onto a trailer tongue.

Yet still another object of the present apparatus is provide a battery-operated winch assembly comprising a guide roller and a cable which provides a means to raise one (1) end of the log off the ground. The winch assembly is securely mounted to the lifting frame.

Yet still another object of the present apparatus is to provide two (2) onboard deep cycle batteries which provide power to the winch assembly.

Yet still another object of the present apparatus is to provide a rear portion of the lifting frame comprising an opening which provides a means of receiving the lifted end of the log and supports the guide roller which provides a means of stability and guidance to the cable.

Yet still another object of the present apparatus is to provide a cable which extends downward and outward from the lifting frame and provides a means of cinching around the end of the log to be lifted and removed from the site.

Yet still another object of the present apparatus is to provide a tow bar assembly comprising a tongue and ball-hitch receiver which provides a means of easily attaching the apparatus to the chassis of a small vehicle which can then be operated in a manner that enables the apparatus to be carefully maneuvered along with the cinched log for removal of the log.

Yet still another object of the present apparatus is to provide a wired remote controlling assembly comprising a remote control which is tethered to a control box by a control cord which provide a means of housing all the necessary electronic components needed to operate the winch assembly and providing a means of controlling the winch assembly at a safe distance.

Yet still another object of the present apparatus is to provide two (2) anti-skid devices comprising a pair of screw jack devices which provides a means of securely anchoring the apparatus to the ground while a log is being loaded onto the lifting frame.

Yet still another object of the present apparatus is to provide a method for utilizing a portable log skidder.

Further objects and advantages of the present apparatus will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
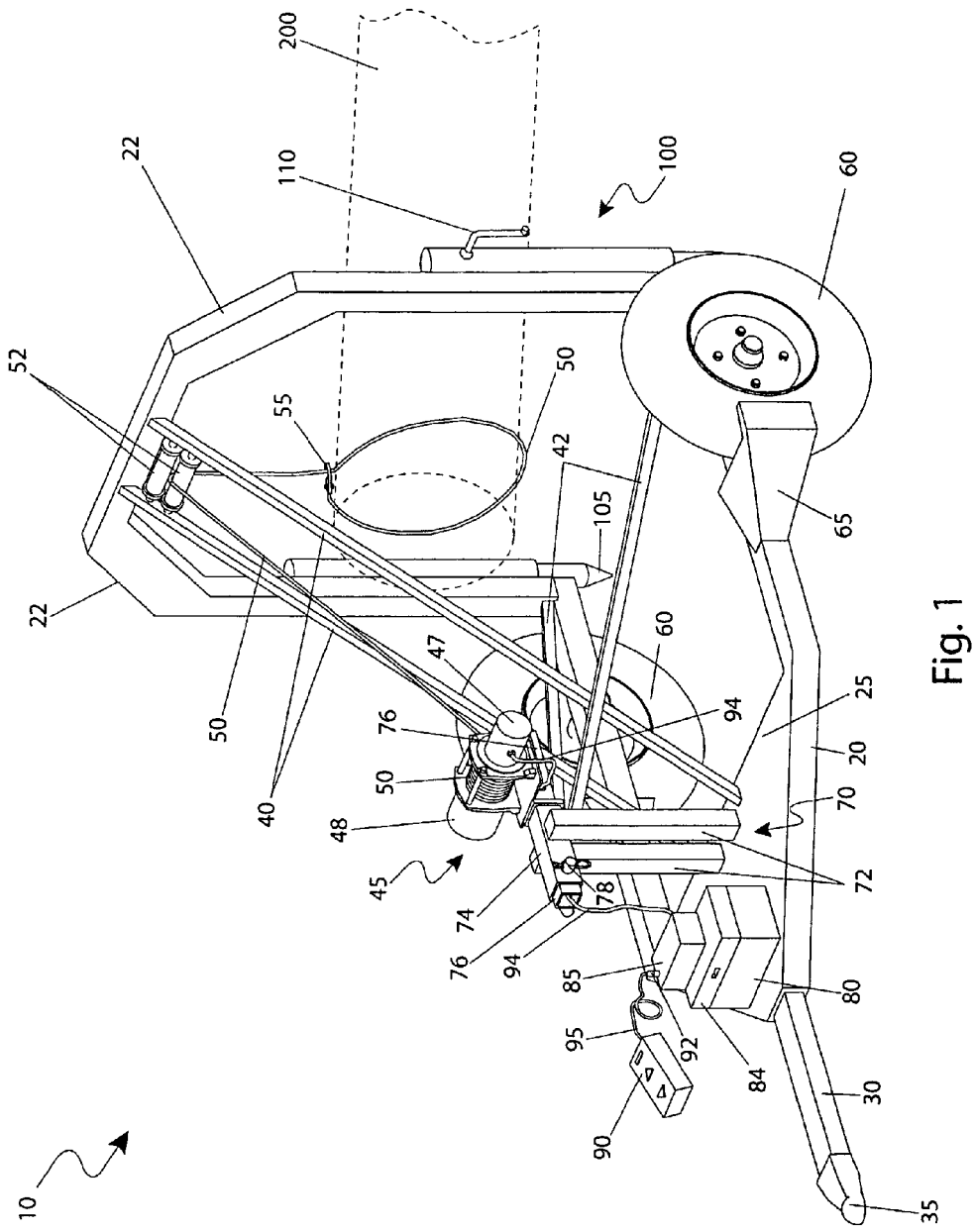
FIG. 1 is a side perspective view of a portable log skidder 10, according to a preferred embodiment of the present invention.

DESCRIPTIVE KEY 10 portable log skidder
20 base frame
22 lifting frame
25 platform
30 tongue
35 ball-hitch
40 upper brace
42 lower brace
45 winch assembly
47 motor
48 gear reduction unit
49 cable pulley
50 cable
52 guide roller
55 hook
60 tire/wheel assembly
65 fender
70 winch support assembly
72 vertical post
74 horizontal post
76 winch mounting bracket
78 locking bolt
80 battery compartment
82 battery
84 lid
85 control box
90 remote control
92 connector
94 wiring
95 tether control cord
96 ON/OFF switch
97 "RELEASE" button
98 "WIND" button
100 anti-skid device
102 body
104 screw shaft mechanism
105 anchoring portion
110 hand crank
200 log
210 ground surface

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a portable log skidder (herein described as the "apparatus") 10, which provides a means for skidding logs 200 while utilizing an all-terrain vehicle (ATV), small tractor, or other tow vehicle to transport a log 200. The apparatus 10 comprises a self-contained battery-operated winch 45. The apparatus 10 takes the form of a utility trailer comprising a standard ball-hitch 35, and a vertical "U"-shaped lifting frame 22 approximately four (4) to five (5) feet tall. The winching system 45 comprises a guide roller 52 utilizing a conventional wire rope cable 50 to skid the log 200. The cable 50 is strapped around one (1) end of the log 200 and secured using a cable hook 55. The log 200 is winched along a ground surface 210 thereto a position below or in proximity thereto the apparatus 10. A pair of on-board deep cycle batteries 82 provides 12-volt direct current (DC) power thereto the winch 45 which is capable of lifting an end portion of the log 200 approximately two (2) feet above said ground surface 210. The winch 45 is operated by a user at a safe distance using a tethered hand-held remote control unit 90.

Figure 2:
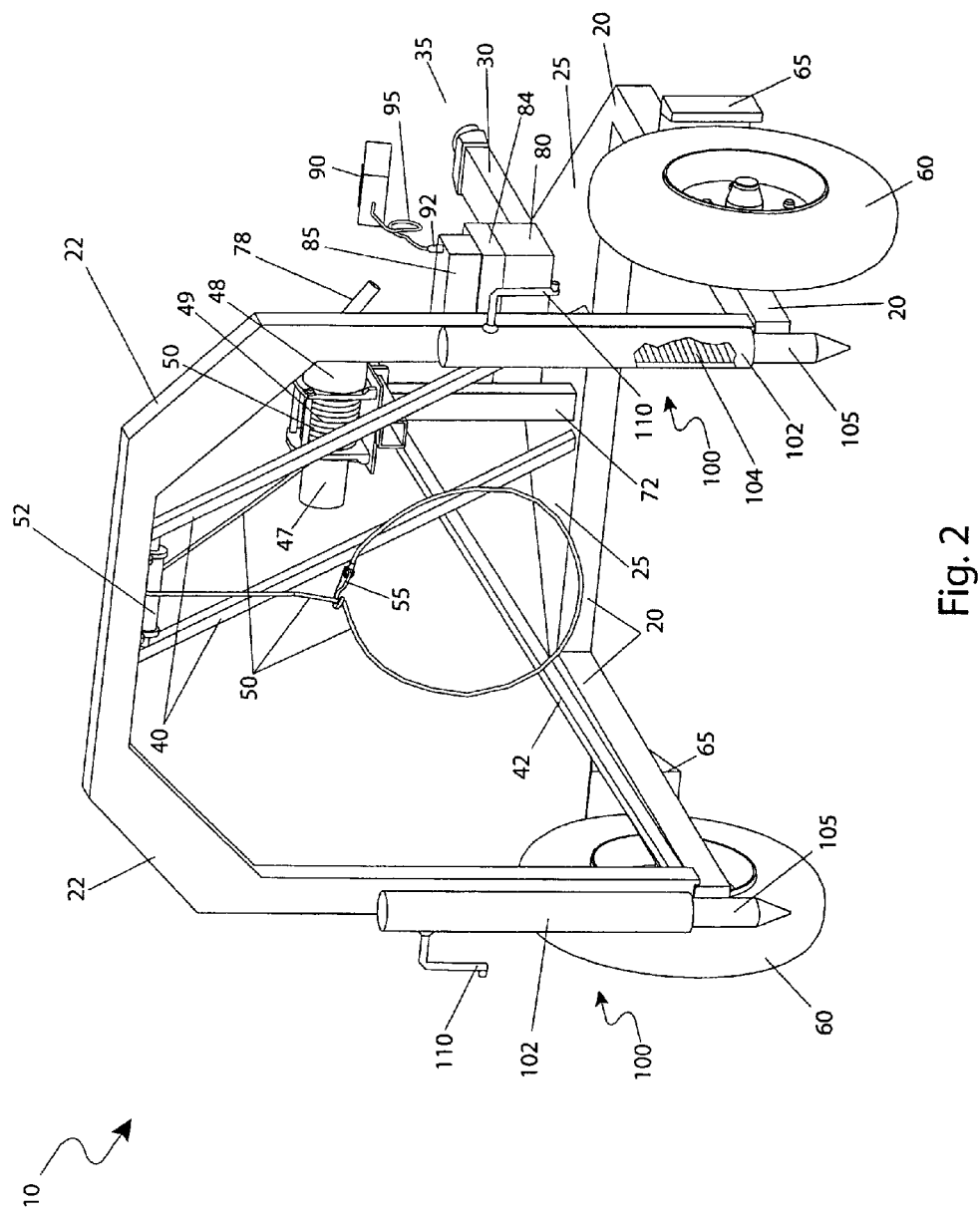
FIG. 2 is a rear perspective view of a portable log skidder 10, according to a preferred embodiment of the present invention.

Referring now to FIGS. 1 and 2, side and rear perspective views of the apparatus 10 according to the preferred embodiment of the present invention, are disclosed. The apparatus 10 comprises a base frame 20, a lifting frame 22, a platform 25, a tongue 30, a ball hitch 35, a pair of upper braces 40, a pair of lower braces 42, and a pair of anti-skid devices 100. The apparatus 10 takes the form of a two-wheeled utility trailer comprising a tubular steel frame and providing a transportable and load bearing structure capable of lifting and supporting a log 200 and subsequently transporting said log 200 in a dragging manner over a ground surface 210.

The base frame 20 comprises a sturdy foundation thereto the apparatus 10 envisioned to be made using an assembly of two (2) inch square structural tubing lengths forming a rigid assembly using common welding processes. Said base frame 20 comprises a pair of steel members arranged in a parallel manner along a horizontal plane being angled inwardly at an intermediate location, thereby converging and joining thereto one another at a proximal end thereof. Said converging base frame 20 members form a triangular shape providing an attachment means thereto a sheet metal platform 25 affixed along upper surfaces of said triangular base frame portion 20, thereby being rigidly affixed thereto using fasteners, welding, or the like. The base frame 20 further provides an attachment thereto a forwardly extending tongue 30 and standard ball-hitch 35 at an extreme proximal end portion in a similar fashion as common utility trailers. The parallel members of the base frame 20 further provide respective welded attachment thereto the lifting frame 22 at a distal end portion thereof. The lifting frame 22 utilizes similar materials as the base frame 20 and forms inclusive ninety (90) degree welded angles. The lifting frame 22 further comprises an upper horizontal member spanning said vertical members, thereby forming a three (3) sided inverted "U"-shaped welded assembly. The lifting frame 22 provides a strong rigid structure being approximately five (5) feet high and four (4) feet wide, thereby providing ample internal clearance thereto a log 200 being lifted and secured therewithin.

The lifting frame 22 further comprises a pair of vertical anti-skid devices 100 being permanently affixed thereto respective rearward facing surfaces of the aforementioned parallel vertical members using common fastening means such as welding, bolts, screws, or the like. The anti-skid devices 100 are envisioned to be similar to manually operated screw-jack devices used to level semi-trailers and providing expected features such as a cylindrical tubular body 102, an internal screw shaft mechanism 104, a downward extending anchoring portion 105, and a hand crank 110. Said anchoring portion 105 comprises a conical or chisel-shaped point thereat a lower end portion capable of penetrating a ground surface 210, thereby providing a horizontal stabilizing means thereto the apparatus 10 thereat a particular location while skidding a log 200. The anti-skid devices 100 are envisioned to be utilized while winching a log 200 therefrom some distance along a ground surface 210.

Figure 3:
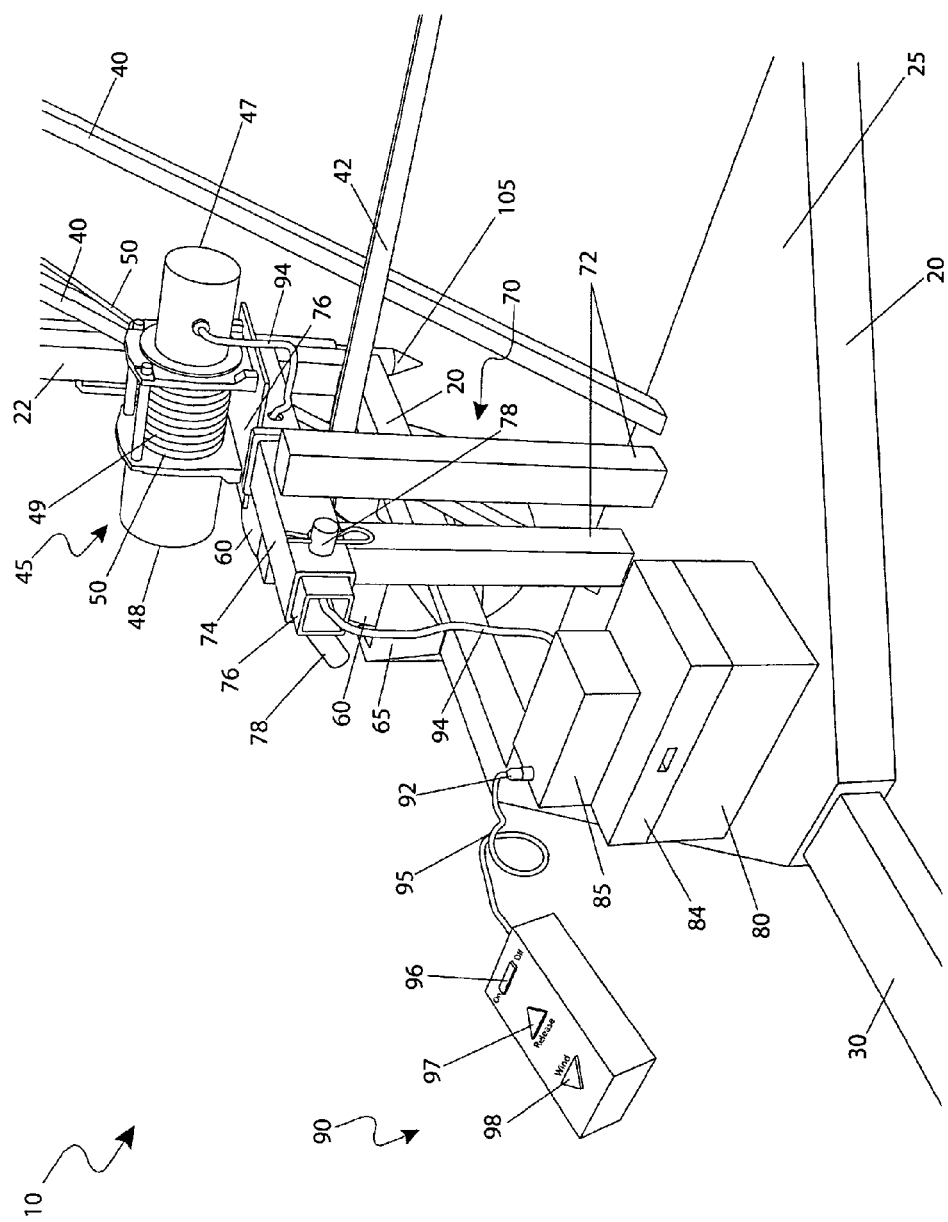
FIG. 3 is a close-up view of the portable log skidder 10, depicting winch assembly 45 and control box 85 portions, according to a preferred embodiment of the present invention; and, FIG. 4 is an electrical block diagram of the portable log skidder 10, according to a preferred embodiment of the present invention.

The base frame 20 further comprises a vertical winch support member 70 affixed thereto and extending upwardly therefrom the platform portion 25 (see FIG. 3). The apparatus 10 further comprises an interconnecting pair of upper braces 40 welded therebetween an upper portion of the lifting frame 22 and the platform 25. The apparatus 10 further comprises an interconnecting pair of lower braces 42 which are welded therebetween a lower portion of the lifting frame 22 and the winch support assembly 70. The braces 40, 42 comprise angle iron members approximately two (2) to three (3) inches in size, extending and being securely welded therebetween the base frame 20, the lifting frame 22, and the winch support member 70, thereby providing additional rigidity thereto the lifting frame 22 during use. The frame bracing 40, 42 provides a closed structural system thereto the apparatus 10 resulting in a rigid and strong interconnected upper frame portion. The base frame 20 further provides an attachment thereto a pair of tire/wheel assemblies 60 and a pair of fenders 65. The tire/wheel assemblies 60 comprise conventional spindle-mounted steel wheels and high-speed pneumatic tires along opposing sides of the base frame 20 at an intermediate position along the parallel member portions of the base frame 20. The fenders 65 are envisioned to comprise strong metal structures having a wedge-shaped design, thereby providing a deflecting and protective means thereto the tire/wheel assemblies 60 being especially affective during off-road use by preventing punctures and abrasion therefrom sharp protrusions and other hazards which may contact the tire/wheel assemblies 60.

Referring now to FIG. 3, a close-up view of the apparatus 10, depicting winch assembly 45 and control box 85 portions, according to a preferred embodiment of the present invention, is disclosed. The apparatus 10 further comprises a hoisting system allowing a user to secure, winch, and hoist an end portion of a log 200 therewithin the lifting frame 22. The apparatus 10 comprises a commercially available electric winch assembly 45, a length of cable 50, a pair of guide rollers 52, and a common cable hook 55. The winch 45 is similar to weather-resistant winching units used on off-road vehicles providing an approximately thirty-five hundred (3500) pound lifting/pulling capacity and providing standard features such as, but not limited to: a 12-volt DC motor 47, approximately one-hundred (100) feet of one-quarter (¼) inch steel cable 50, an integral gear reduction unit 48, and a barrel-style cable pulley 49. The motorized winch 45 provides tension thereto the drive cable 50 which extends at an upward angle thereto a standard guide roller unit 52 comprising a pair of parallel barrel rollers affixed thereto an upper central portion of both upper braces 40 at a location adjacent thereto the lifting frame 22. Said cable 50 passes therethrough the guide rollers 52 and in turn extends downwardly and outwardly providing a cinching attachment thereto a log 200 via an affixed common cable safety-hook 55. It is envisioned that in use, the cable 50 is wrapped around a log 200 and secured thereby routing therethrough the hook 55.

The winch assembly 45 provides a rugged attachment means thereto the platform 25 via a winch support assembly 70 made using structural steel tubing, thereby providing an adjustable anchoring means thereto the winch assembly 45. The winch support assembly 70 further comprises a pair of vertical posts 72, a horizontal post 74, a winch mounting bracket 76, and a locking bolt 78. The vertical posts 72 comprise a pair of parallel tubing members having a gap therebetween of approximately three (3) inches and providing an attachment thereto the horizontal post 74 securely welded thereto both vertical posts 72 and being arranged at a right angle thereat a top portion of said vertical posts 72 forming a strong "T"-shaped weldment. The winch support assembly 70 is approximately two (2) to three (3) feet high being securely welded thereto a top surface of the platform 25 and/or the base platform 20. The horizontal post 74 comprises a length of tubing approximately six (6) to twelve (12) inches long having a particular inner opening so as to slidingly receive the winch mounting bracket 76. The winch mounting bracket 76 comprises a length of structural tubing having a rectangular plate welded thereto a top surface thereat a rearward end portion, thereby providing a mounting platform for mounting said winch assembly 45 thereupon. The tube portion of the winch mounting bracket 76 is of a slightly smaller size as the horizontal post 74, thereby providing a lateral adjustment means thereto the winch assembly 45 along a long axis of the apparatus 10. Said winch assembly 45 is affixed thereto said winch mounting bracket 76 at corner positions using four (4) common fasteners such as bolts. Said winch mounting bracket 76 is slidingly inserted therein the horizontal post portion 74 of the winch support member 70 and secured in position using a locking bolt 78. The locking bolt 78 comprises a common hardware component such as a hitch pin, quick-release pin, or the like, passing therethrough corresponding drilled hole portions of the horizontal post 74 and the inserted winch mounting bracket 76. Removal of said locking bolt 78 provides convenient removal of the winch assembly 45 when not in use, thereby providing security against theft thereto the apparatus 10 when unattended.

The apparatus 10 further comprises a rectangular plastic or metal battery compartment 80, a control box 85, a remote control 90, and a tether control cord 95 providing a 12-volt power source and tethered control means thereto the apparatus 10. The battery compartment 80 comprises a weather-proof enclosure with a latching lid 84. The battery compartment 80 provides an attachment means thereto the platform 25 along a bottom surface thereof and further provides a protective housing thereto a pair of deep-cycle marine-type batteries 82 therewithin. The battery compartment 80 provides an attachment means along a top surface thereto a control box 85 using common fasteners such as screws. The control box 85 comprises a weather-proof plastic electrical enclosure approximately six (6) inches square providing a housing means thereto internal electronic and electrical switching components required to control the winch assembly 45 (see FIG. 4). The control box 85 further provides a removably attachable means thereto a tether control cord 95 and integral hand-held remote control 90 via a common indoor/outdoor plugging connector 92 allowing a user to stand at a safe distance while operating the apparatus 10.

Figure 4:
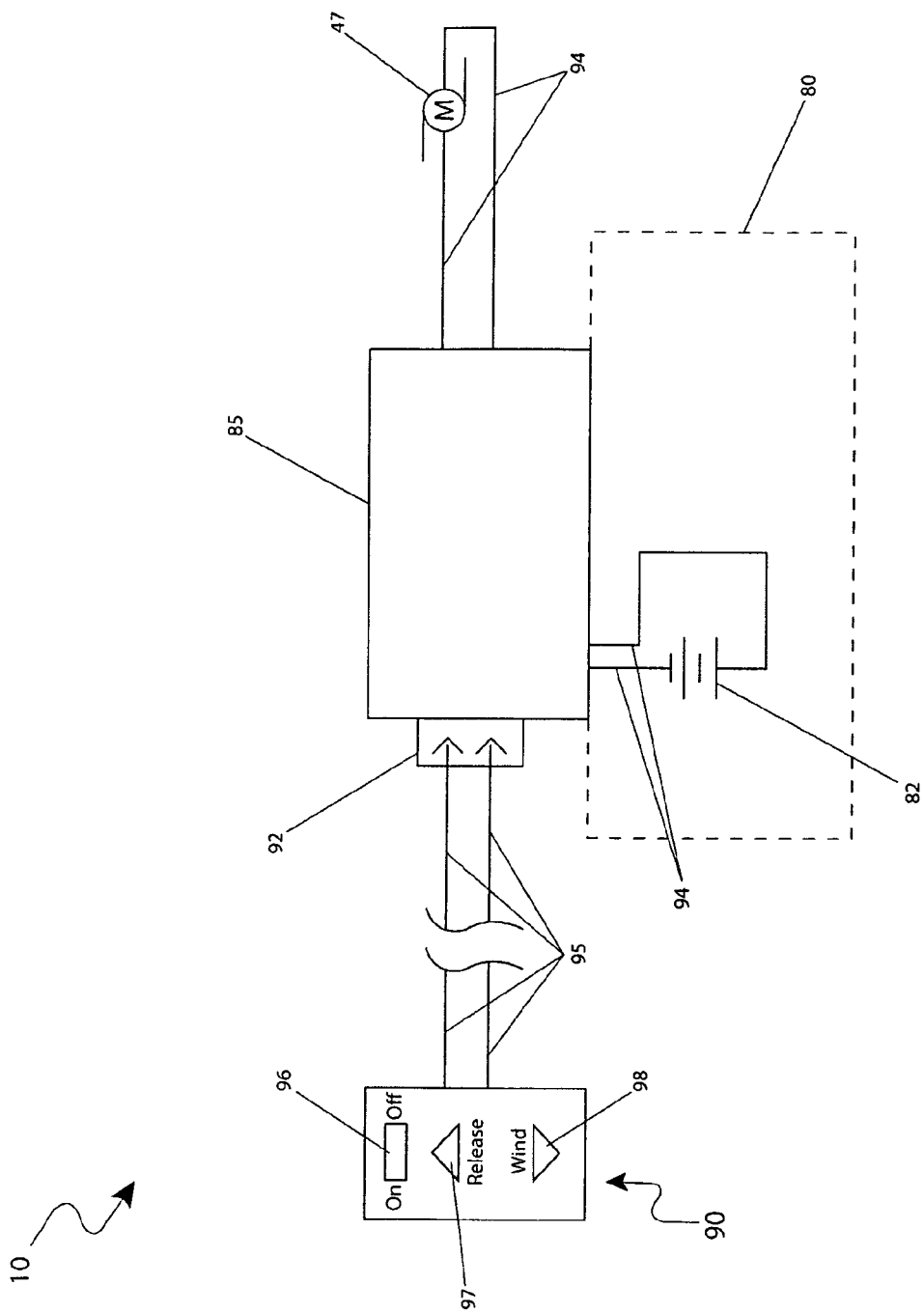

Referring now to FIG. 4, an electrical block diagram of the portable log skidder 10, according to a preferred embodiment of the present invention, is disclosed. DC electric power is supplied thereto the apparatus 10 via a pair of 12-volt deep-cycle batteries 82. Said DC power is conducted therethrough common copper conductor wiring 94 thereto the control box 85. The control box 85 comprises electrical switching components such as, but not limited to: circuit boards, relays, wiring, and the like required to control a bi-directional operation of the winch assembly 45. The control box 85 receives operator initiated switching voltages therefrom a hand-held remote control 90 via the tether control cord 95, to motion the winch assembly 45 to wind or release a length of cable 50 and subsequently motion the log 200. The remote control 90 comprises an ON/OFF rocker-type switch 96 to electrically activate/deactivate the control box 85. The remote control 90 further comprises a cable "RELEASE" arrow button 97, and a cable "WIND" arrow button 98; however, other various indicia may be used to indicate direction of cable 50 travel. The arrow buttons 97, 98 are envisioned to comprise momentary-contact illuminated switches. Upon activation of the arrow buttons 97, 98, a correspondingly polarized current is in-turn conducted thereto the winch motor 47 to release or lift the log 200.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIGS. 1 and 2.

The method of utilizing the apparatus 10 may be achieved by performing the following steps: charging the 12-volt batteries 82 therewithin the battery compartment 80; attaching the apparatus 10 thereto an ATV, small tractor, or other vehicle using the ball-hitch 35; transporting the apparatus 10 to a desired job site; securing the apparatus 10 thereat a location using the two (2) anti-skid devices 100; extending the anchoring portion 105 of said anti-skid devices 100 thereinto a ground surface 210 by manually rotating the manual hand cranks 110; extending a length of cable 50 therefrom the winch 45 by pressing the "RELEASE" arrow button 97 on the remote control 90; looping the cable 50 around an end portion of a log 200; securing the cable 50 thereto the log 200 by routing said cable 50 therethrough the hook 55; dragging and/or lifting the log 200 by activating the winch 45 by pressing the "WIND" arrow button 98 on the remote control 90; continuing to wind a length of cable 50 so as to drag the log 200 from a distance along a ground surface 210; lifting an end portion of the log 200 therein the lifting frame 22 thereto a desired height above a ground surface 210; retracting the anchoring portions 105 of the anti-skid devices 100 using the respective hand cranks 110; transporting the apparatus 10 and suspended log 200 using a full size or small vehicle such as an ATV or small tractor, to a desired location for further processing of said log 200 to be harvested for firewood, lumber, or other purposes; and, benefiting from a compact apparatus 10 which provides sufficient winching 45 and transporting capability to move heavy logs 200 using a small vehicle.

The apparatus 10 is envisioned to comprise a narrow overall width, thereby effectively fitting into confined areas being too narrow for conventional log skidders, full-sized vehicles, or trailers. The apparatus 10 allows moving and extracting logs 200 in a convenient and safe manner by a single operator. It is also appreciated that the apparatus 10 provides particular enhancements such as the ball-hitch 35 and pneumatic tires 60, thereby allowing a user to transport said apparatus 10 using a variety of different vehicles such as ATVs, small tractors, and pickup trucks. Said enhancements further facilitate transportation of the apparatus 10 over both off-road and highway surfaces as desired.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A portable log skidder apparatus, comprising:
a base frame comprising a pair of wheel assemblies;
a platform affixed along upper surfaces of said base frame;
a winching system secured thereto said platform and providing a means for lifting a log;
a lifting frame connected to a rear end of said base frame, comprising a pair of vertical members extending perpendicularly upwards therefrom said base frame and an upper horizontal member spanning said vertical members;
a pair of upper braces and a pair of lower braces each secured therebetween said base frame and said lifting frame;
a tongue connected to a front end of said base frame and extending horizontally outwards therefrom;
a connection means connected to said tongue, thereby allowing said apparatus to be removably connected to a tow vehicle; and,
a remote control unit electrically connected to said winching system, thereby allowing a user to operate said winching system from a remote location;
wherein said winching system further comprises:
a guide roller assembly affixed to an upper central portion of said pair of upper braces; and, a wire rope cable mechanically connected to said guide roller, thereby skidding said log;

wherein said apparatus provides a means for lifting and transporting said log; and, wherein said pair of upper and lower braces provide an additional structural rigidity to said apparatus.

2. The apparatus of claim 1, wherein said lifting frame further comprises a pair of anti-skid devices each affixed to rearward facing surfaces of one of said pair of lifting frame vertical members and further comprising an anchoring means operated thereby a manual hand crank, thereby providing a horizontal stabilizing means thereto said apparatus thereat a particular location while skidding said log.

3. The apparatus of claim 1, wherein said log is secured to said wire rope cable via a cable hook.

4. The apparatus of claim 1, wherein said connection means comprises a ball hitch.

5. The apparatus of claim 1, wherein said lifting frame is approximately four (4) to five (5) feet tall.

6. The apparatus of claim 1, wherein said winching system comprises a battery-operated winch.

7. The apparatus of claim 1, wherein said base frame comprises an assembly of two (2) inch square structural tubing.

8. The apparatus of claim 1, wherein said apparatus further comprises a vertical winch support member affixed thereto and extending upwardly therefrom said platform.

9. The apparatus of claim 1, wherein said pair of upper braces and said pair of lower braces each comprise angle iron members approximately two (2) to three (3) inches in size.

10. The apparatus of claim 1, wherein said pair of wheel assemblies each further comprise a fender.

11. The apparatus of claim 1, wherein said pair of wheel assemblies each further comprise spindle-mounted steel wheels and high-speed pneumatic tires along opposing sides of said base frame.

12. The apparatus of claim 1, wherein said winching system comprises an approximate thirty-five hundred (3500) pound lifting/pulling capacity.

13. The apparatus of claim 1, wherein said apparatus further comprises a housing means thereto internal electric components.

14. The apparatus of claim 13, wherein said housing means comprises a battery compartment attached thereto said platform.

* * * * *